US006799595B1

(12) United States Patent
Salan et al.

(10) Patent No.: US 6,799,595 B1
(45) Date of Patent: Oct. 5, 2004

(54) MELTABLE AND RECLOSABLE DRAIN PLUG FOR MOLTEN SALT REACTOR

(75) Inventors: Jerry S. Salan, Hughesville, MD (US); Michael A. Lateulere, Marbury, MD (US); John E. Brough, Springfield, VA (US); Wendell R. Lee, White Plains, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/379,654

(22) Filed: Mar. 6, 2003

(51) Int. Cl.[7] .............................................. F15C 1/04
(52) U.S. Cl. ..................... 137/13; 137/828; 137/341; 137/592
(58) Field of Search ................... 137/828, 341, 137/13; 222/592, 593

(56) References Cited

U.S. PATENT DOCUMENTS

| | | | | |
|---|---|---|---|---|
| 3,052,253 A | * | 9/1962 | Priaroggia et al. | 137/74 |
| 3,271,132 A | | 9/1966 | Groves | 75/68 |
| 3,435,992 A | * | 4/1969 | Tisdale et al. | 222/246 |
| 3,463,365 A | * | 8/1969 | Dumont-Fillon | 222/544 |
| 3,701,357 A | * | 10/1972 | Granstrom et al. | 137/827 |
| 3,721,255 A | * | 3/1973 | Suzuki et al. | 137/807 |
| 3,982,582 A | * | 9/1976 | Knorr et al. | 164/136 |
| 4,083,478 A | | 4/1978 | McLane | 222/592 |
| 4,271,993 A | | 6/1981 | Anderson | 222/591 |
| 4,412,805 A | | 11/1983 | Morrison | 425/549 |
| 4,612,959 A | * | 9/1986 | Costello | 137/828 |
| 4,655,237 A | * | 4/1987 | Gloor et al. | 137/13 |
| 4,872,897 A | | 10/1989 | Krejci et al. | 65/128 |
| 5,434,335 A | | 7/1995 | Brummond et al. | 588/201 |
| 5,649,992 A | | 7/1997 | Carter, Jr. et al. | 75/10.14 |
| 5,820,815 A | | 10/1998 | George | 266/45 |
| 6,210,629 B1 | | 4/2001 | Bruckner et al. | 266/45 |
| 6,299,830 B2 | | 10/2001 | Raivo et al. | 266/272 |

OTHER PUBLICATIONS

Hsu et al; FY98 Final Report for the Expedited Technology Demonstration Project: Demonstration Test Results for the Integrated MSO Waste Treatment System UCR-L–ID–133534.

* cited by examiner

*Primary Examiner*—A. Michael Chambers
(74) *Attorney, Agent, or Firm*—Mark Homer

(57) ABSTRACT

An apparatus and method for selectively draining melt material, such as molten salt, utilizes an unobstructed drain conduit detachably connected, as by screw threads, to a vessel containing the material. Two heaters are utilized for the conduit, a drain heater at the vessel and a plugging heater spaced from the vessel. The conduit is placed at the plugging heater and partially filled with a predetermined quantity of plugging material in flowable form. The plugging material is, typically, the same salt in particulate form and is retained in the conduit by any suitable closure. The plugging heater is energized to melt the plugging material and is then de-energized so that a solid plug of this material forms in the conduit. The conduit, including the plug, is removed from the closure and the plugging heater and is connected to the vessel when the drain heater is de-energized and when the vessel does not contain molten melt material, as when the vessel is empty or this material is solidified. The molten material is then established in the vessel with limited heat transfer to the conduit so that the plug does not melt. When the melt material is to be drained, the drain heater is energized to heat the conduit and melt the plug so that the melt material drains through the conduit. When the conduit is suitably configured, such a quantity of the melt material may remain in the conduit to form another plug when the drain heater is de-energized.

10 Claims, 1 Drawing Sheet

MELTABLE AND RECLOSABLE DRAIN PLUG FOR MOLTEN SALT REACTOR

BACKGROUND OF THE INVENTION (1) Field of the Invention

The present invention relates to the use of molten salts for hazardous or toxic waste destruction. The invention further relates to the dispensing of molten materials through an aperture heated or cooled to open or seal the aperture.

(2) Description of the Related Art

In a molten salt reactor for the disposal of a hazardous material, the material is fed into a reaction vessel containing a molten salt, typically sodium carbonate at 900–1000° C. In the salt, flameless oxidation converts organic components of the material into $CO_2$, $N_2$, and $H_2O$ which are removed as gases; acid-forming components of the material are converted into salts such as NaCl, which are retained in the molten salt; and the remaining components, such as metals, are also retained in the salt in metallic or oxide form. The vessel is provided with a suitable heater, typically electric, to melt the salt initially; and a heater may be required continually if reactions in the salt do not release sufficient heat to keep it molten. Some hazardous materials have sufficient oxygen for the oxidation; but if not, air is injected into the salt.

The molten salt is drained from time to time and allowed to solidify, thereby removing and capturing the materials retained in the molten salt. The solidified material is then processed to remove the retained material in ways appropriate thereto, and the salt is recycled to the reactor.

Since the molten salt is, typically, highly corrosive and erosive to most engineering materials, valves for such materials are impractical for the retention and draining of the molten salt. Therefore, it is known to provide the vessel with an exit conduit, which is normally at a temperature below the melting point of the salt, but which is provided with a drain heater to heat the conduit above this point. Initially, a plug of frozen salt is established in the conduit to retain the molten salt in the vessel during the disposal reaction, and the salt and retained materials are drained by energizing the drain heater to melt the plug.

Insofar as known to the applicants, heretofore in this "frozen plug" approach for draining molten salt from a reactor for waste disposal, the frozen salt plug was formed by providing the exit end of the drain conduit with a mechanical plug and allowing molten salt from the vessel to enter the conduit and solidify at the mechanical plug, the existence of the frozen salt plug being confirmed after its formation by removing the mechanical plug. Also, the amount of salt required in the vessel to establish the salt plug was a substantial portion of the total amount required for the molten salt reaction; for example, 50 kg. of new or recycled salt was required to establish the plug for a total amount of 160 kg.

However, applications of a plug by freezing a molten material to close a conduit and then melting the plug to reopen the conduit are known for a variety of substances other than molten salts. In these applications, an additional mechanical block may or may not be used, and it is known to use and variously control a number of forms of energy for melting the plug. Representative examples of such applications are provided in the following four United States patents:

In U.S. Pat. No. 4,083,478, which issued 11 Apr. 1978 to McLane for a "Molten metal shut-off valve utilizing cooling to solidify metal flow", a restricted passageway for molten lead is "surrounded by a coolant chamber which, when supplied with coolant, cold water for example, chills the passageway very rapidly to solidify the lead flowing therethrough into a solid slug which then blocks the passageway against further flow", the passageway being located so "that upon draining of the coolant chamber the solidified slug in the restricted passageway is quickly heated to the melting temperature of the lead to re-establish the flow through the valve . . . ."

U.S. Pat. No. 4,271,993, which issued 9 Jun. 1981 to Anderson for a "Slag tap for coal slagging gasifier" in which "containment materials . . . are subject to aggressive erosion, corrosion and thermal attack by the [molten] slag and iron", discloses tapping thereof "initiated and controlled by stopping or reducing" the output of a burner.

U.S. Pat. No. 5,649,992 issued 22 Jul. 1997 to Carter, Jr. for "Methods for flow control in electroslag refining process" discloses a variety of ways for controlling the flow of molten refined metal "by coordinating, among other parameters: the rate of melting of the unrefined metal; the hydrostatic head of molten metal and slag above the bottom pour cold finger orifice; the rate of induction heat supplied to the metal within the cold finger apparatus; the rate of heat removal from the metal within the cold finger apparatus through the cold finger apparatus itself and through adjacent gas cooling means; and by applying electromagnetic force to selectively speed up, slow down and/or interrupt the flow of metal through the cold finger apparatus via an electromagnetic orifice, preferably utilizing a processor, such as a computer."

U.S. Pat. No. 6,210,629 issued 3 Apr. 2001 to Bruckner, et al. for a "Method and device for discontinuous parting off of molten mass" wherein an "inductor surrounds a passage through which the melt is discharged from a vessel. The inductor applies radial electromagnetic energy to the passage to maintain the melt in a molten state. To stop flow of the melt through the passage, an outlet opening of the passage is closed and the inductor is electrically switched off while a cooling medium is flowed through the inductor. To begin flow of the melt, the outlet opening of the passage is opened and the inductor is electrically switched on." For redundancy in opening and closing, the passage is provided with a mechanical closure as well as the described device.

However, due to the properties of molten salt and systems using molten salt, such a plug and removal system has not been attempted. Also, due to these properties and the use of mechanical plugs and vacuuming means necessary to remove excess molten salt have made molten salt systems expensive and dangerous to operate. Therefore, for many uses, these systems have not been commercially employed. Thus, it is desired to develop a molten salt system plug and removal system and method that does not employ a mechanical plug and employs residue molten salt from within the system.

SUMMARY OF THE INVENTION

The present invention is concerned with apparatus and methods for selectively draining melt material such as molten salt material which has reacted in a vessel to dispose of waste materials, particularly energetic materials. The invention utilizes a meltable and reclosable drain plug disposed in a drain conduit otherwise unobstructed by mechanical closures such as valves or caps. The conduit is used with a first, or drain, heater at the vessel and a second, or plug forming, heater spaced from the vessel. These heaters may utilize any form of energy, electrical energization being convenient.

The conduit is detachably connected to a drain opening of the vessel in any suitable manner, as by screw threads, the conduit being detached from and reattached to the vessel when the first heater is de-energized and when the vessel does not contain molten melt material, as when the vessel is empty or the reaction material solidified.

Initially, the conduit is detached from the vessel; placed at the second heater; and partially filled with a predetermined quantity of plugging material which is in flowable form and is sufficient to block the conduit. This material is, preferably, the same salt material used for reaction in the vessel so as to not contaminate the drained material. Such salt material is, typically, provided in particulate form, and can be retained in the conduit by any suitable closure. The second heater is first energized to melt the plugging material and is then de-energized so that a solid plug of this material forms in the conduit.

The conduit, including the plug, is removed from the closure and the second heater and is then reattached to the vessel. The molten reaction material is then formed in the vessel by heat supplied by sources which are not directly involved in the present invention. The conduit is, typically, constructed, of material effective for heat transfer; but is disposed in relation to the vessel so that the plug does not melt because heat transfer to the conduit from the vessel is limited, and heat transfer to the environment keeps the temperature of the plug below the melting point of the plugging material.

When the melt material is to be drained, the first heater is energized to heat the conduit and melt the plug so that the melt material drains through the unobstructed conduit.

A new plug may be established in the conduit by removing the conduit from the vessel to the second heater, as above described. However, when the conduit is suitably configured, a quantity of the melt material corresponding to the above-specified predetermined quantity may remain in the conduit after draining the vessel. With this configuration, the first heater is de-energized after substantially draining the vessel so that the melt material in the conduit solidifies to form another plug in the conduit.

It is an object of the present invention to provide for draining process materials that corrode, erode, and jam mechanical closures.

Another object is to provide such draining by a meltable plug formed conveniently with a small quantity of plugging material that does not contaminate drained process material.

Yet another object is to provide for the formation of such a plug, after draining a reaction vessel, without cooling the vessel or application of mechanical closures at the vessel.

Further objects are to provide such draining with apparatus which is simple in construction and methods which is simple in operation, the apparatus and methods being dependable and being particularly and fully effective with molten salts used for waste disposal.

BRIEF DESCRIPTION OF THE DRAWINGS

These and other objects, advantages, and novel features of the present invention will be apparent from the following detailed description when considered with the accompanying drawings wherein.

DETAILED DESCRIPTION OF THE INVENTION

Figures 1, 2:
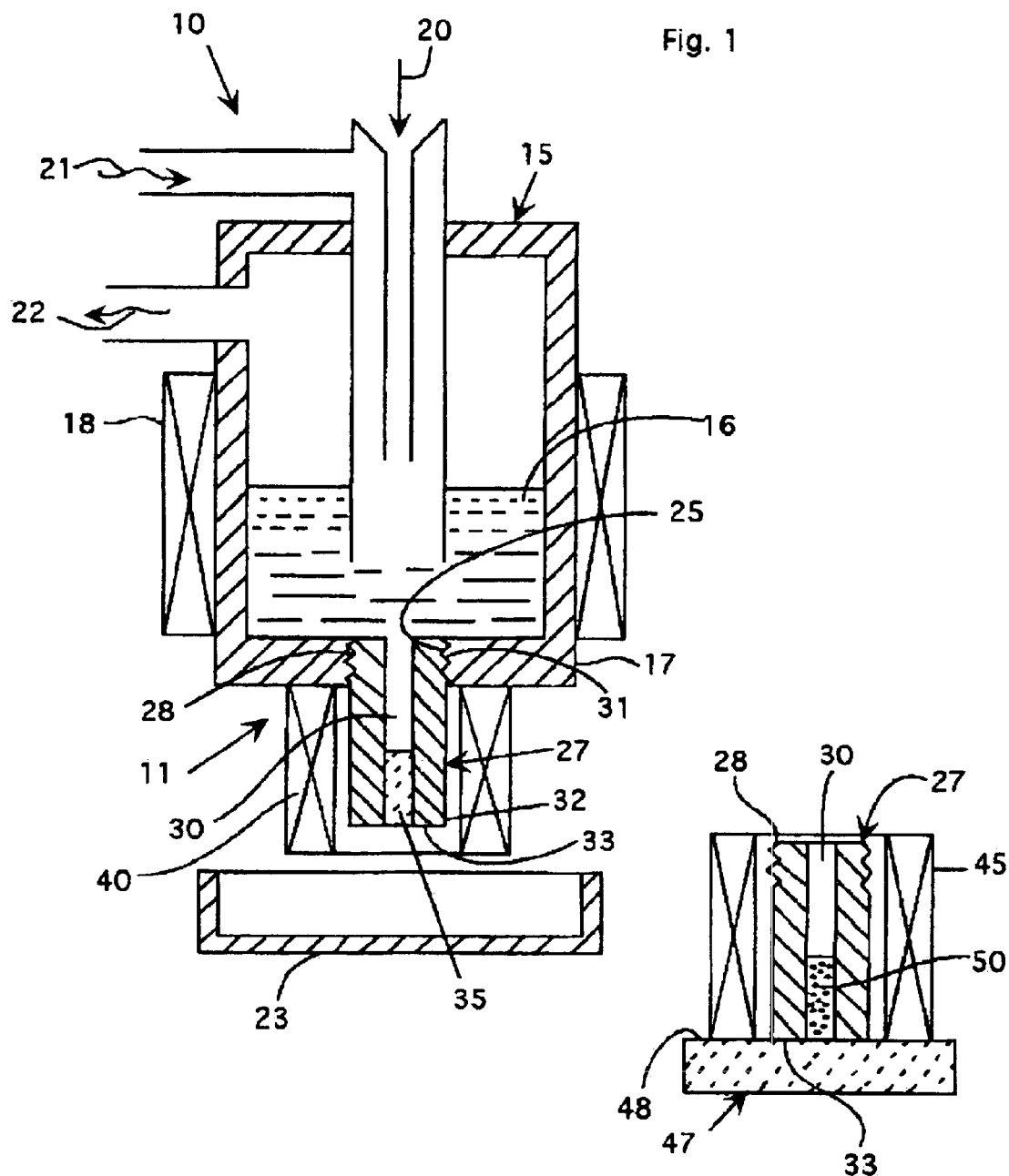
FIG. 1 is a schematic sectional view of a molten salt reactor including a meltable and reclosable drain plug apparatus embodying the present invention.
FIG. 2 is a schematic sectional view of additional apparatus embodying the present invention and including a heater receiving a conduit and drain plug material.

Referring more particularly to the drawings, in FIG. 1 is shown a reactor which is indicated generally by the numeral 10 and which is a representative operating environment for meltable and reclosable drain plug apparatus and methods embodying the principles of the present invention, the apparatus being indicated in FIG. 1 by numeral 11 and including elements shown in FIG. 2.

Reactor 10 includes a vessel 15 containing a melt material or substance 16. The vessel depicted as being generally cylindrical, having a lower portion 17, and being surrounded by any suitable heater 18. This heater and other heaters mentioned herein are schematically represented as using electrical energy, but any suitable source of heat may be used in connection with the present invention.

When reactor 10 is in operation, material 16 is above its melting point and is thus a flowable liquid. As described above, the material is maintained above its melting point by heat from reactions in the material and/or by heater 18.

Vessel 15 is provided with an inlet for the introduction, as indicated by arrow 20, of material utilized for melt material 16 and for reaction therewith. The vessel has a conduit for the introduction of air or other gases into the melt material, as indicated by arrow 21, and has a conduit for the removal of gasses from the reaction as indicated by arrow 22. Reactor 10 is provided with a drain pan 23 below the vessel for reception of melt material as subsequently described.

It will be apparent, that the principles of the present invention are effective with any arrangement or materials wherein a liquid at a temperature in a range above its freezing point is to be drained selectively or at a predetermined time. The invention is, therefore, not limited to the depicted reactor 10, which is schematically represented as background for the invention; nor is the invention limited to any particular materials for reaction in the reactor.

However, the invention is particularly adapted for draining a melt material selected to consist substantially of at least one carbonate salt, such as sodium carbonate, effective in molten form for waste disposal, particularly of waste energetic or explosive materials. The particular salt or salts, substance or substances for disposal, and reactions therebetween are not involved in the invention except to the extent related molten materials may be advantageously drained in accordance with the principles of the invention.

Apparatus 11 includes a drain aperture or opening 25 formed in the lower portion 17 of vessel 15 and adapted for detachable connection to a tubular drain conduit 27, as by mating screw threads 28 formed in this vessel portion and on the conduit.

Conduit 27 is constructed of any suitable heat conducting material and has a central passage 30 between an inlet portion 31 of the conduit and an outlet portion 32 thereof, the inlet portion bearing the threads 28. It is apparent that these threads provide for selectively connecting and disconnecting the conduit to vessel 10 with the inlet portion communicating with drain aperture 25 for admission of molten material 16 to the passage.

For the purposes of the present invention, a conduit corresponding to conduit 27 may be detachably connected to a vessel corresponding to vessel 15 other than by screw threads. Similarly, while the conduit is represented as terminating at its outlet portion 32 in a planar, annular surface 33 for convenience in illustration, this portion may have any other configuration for a purpose subsequently described.

Within conduit 27, passage 30 is unobstructed by any portion of the conduit or any valve, cap, or the like. However, in accordance with the present invention, conduit 27 is provided with a meltable and reclosable drain plug 35 disposed in passage 30 so as to block flow of material 16 from vessel 15. The plug is formed by a predetermined quantity of any suitable material having a predetermined melting point, a sufficient quantity of the material being selected to close the passage. This quantity remains in place in the passage when the quantity is below said melting temperature after the quantity is melted in the passage and subsequently cools therein to below this temperature.

Typically, this material is selected as the same material used for the basic process or melt material 16 which has a predetermined melting temperature and is maintained above this temperature in vessel 15. When this material is an above-identified salt material such as is effective for waste disposal, the material is, typically, supplied in particulate or granulated form and is thus in a form which is flowable when below the predetermined melting point.

Apparatus 11 includes a first or drain heater 40 positioned in relation to vessel 15 so as to surround conduit 27 when this conduit is attached to the vessel. The drain heater has any suitable construction such that, when this heater is energized, heat from it heats conduit 27 above the melting point of plug 35 so that the plug dissipates by melting and allows molten material 16 to drain from the vessel through passage 30 into pan 23.

Conduit 27 is disposed in a heat conducting relation to vessel 15, heater 40, pan 23 and the environment such that heat transfer from the vessel and molten material 16 does not raise plug 35 above its melting point when heater 40 is de-energized. It is apparent that heater 40 is energizable to heat conduit 27 above the melting temperature of the material of plug 35 and is de-energizable so that the conduit cools below this temperature.

Apparatus 11 includes a second or plug forming heater 45 which is similar to heater 40, but is spaced from vessel 15 and is, accordingly, shown in FIG. 2. Heater 45 is thus adapted to heat conduit 27 when this conduit is disconnected from the vessel and is disposed within heater 45. It is apparent that heater 45 may be energized to heat the conduit above the melting temperature of the material used for plug 35 and may be de-energized so that the conduit cools below this temperature.

For illustrative purposes, heater 45 is represented as having a base 47 of any suitable refractory material. This base has a planar surface 48 on which conduit end 33 rests to support conduit 27 in a vertical position and to form a closure at the conduit outlet end 32. However, it will be subsequently apparent that, for the purposes of methods of the present invention for forming a plug such as plug 35, the orientation of a conduit, which corresponds to conduit 27, when a plug is formed in the conduit need not be a vertical orientation. Also, the closure of the conduit for this purpose may be achieved in any desired manner, as by providing a screw-threaded cap at the conduit outlet portion 32.

In FIG. 2, conduit 27 is shown as containing, in its passage 30, a quantity 50 of the material which forms plug 35. This quantity is the above-identified predetermined quantity required for the plug and is in the above-described particulate or granulated form which is flowable when below the predetermined melting point. It is evident from FIG. 2 that such material in this form may be poured into passage 30 when the conduit is disposed at heater 45 and downwardly closed in any suitable manner to retain such quantity in the conduit. It is also evident that the quantity will then transversely plug the conduit when heater 45 is energized to melt the quantity in the conduit and then de-energized so that the quantity cools and solidifies in the conduit.

In the most preferred embodiment of the invention, the melt material 16 comprises a salt material as discussed above that is initially in granular form. The conduit 27 is connected to the drain aperture 25. A drain heater 40 is capable of heating the conduit 27 to a temperature above the melting point of the salt material 16. A second heater 18 is capable of heating the vessel 15 above the melting point of the salt material 16. When the drain heater 40 and second heater 18 are energized, the salt material 16 may flow out of an end of the conduit 27 because it is in a molten, flowing form. In this configuration, substantially all of the salt material 16 flows out of the vessel 15, through the end of the conduit 27. However, due to a lack of head pressure, a residue of the salt material 16 remains in the vessel 15, mainly adhering to vessel 15 walls as it slowly trickles down towards the conduit 27. When the drain heater 40 is de-energized, this residue salt material 16 wicks in the bottom of the conduit 27, freezing to become a solid plug 35. The second heater 18 may then be de-energized so that additional salt material 16 may be added to the vessel 15, the solid plug 35 prohibiting the new salt material 16 from exiting through the conduit 27 until the drain heater 40 and second heater 18 are energized. In order for the invention to operate as described, the dimensions, effectiveness, and materials of the drain conduit 27, drain heater 40, vessel 15, and second heater 18 are dependent upon the salt material 16 selected and may be determined by one skilled in the art in accordance with the invention described herein.

Method and Operation

In methods embodying the principles of the present invention and in the operation of the above-described apparatus thereof, wherein the vessel 15 has been provided with the drain aperture 25 and the conduit 27 connected to the vessel, the conduit is disconnected from the vessel when it does not contain the melt material 16 in flowable form; and, preferably, when drain heater 40 is de-energized. As mentioned above, material 16 may not be present in molten form because the vessel does not contain this material, as before this material is added initially or after it is drained, or the material 16 maybe in solid form as by cooling after reaction with vessel heater 18 de-energized.

When conduit 27 is removed from vessel 15, the conduit is closed, typically at its outlet portion 32, as by placing this portion against any suitable surface. Such a surface is represented conceptually by surface 48 in FIG. 2; but, as described above, may be any suitable closure for conduit passage 30.

When conduit 27 is so closed, the predetermined quantity 50 of meltable plugging material is placed in passage 30 as depicted in FIG. 2, and the conduit, which is now detached from vessel 15, is disposed for heating by the second or plug forming heater 45. When this heater is then is energized so as to melt quantity 50 in the conduit, the now molten quantity extends across the passage 30. Next, heater 45 is de-energized so that conduit 27 cools below the melting point of the plugging material and the quantity 50 thereof solidifies in passage 30 for use as the plug 35 shown in FIG. 1.

It is apparent that the predetermined quantity 50 of plugging material has thus been placed in conduit 27, and after being retained therein by closure thereof, transversely plugs the conduit when melted in the conduit and subsequently solidified in the conduit by cooling the conduit to solidify the quantity into a plug, such as plug 35, blocking passage 30 and retained in the passage upon solidification by adherence to the conduit.

Conduit 27 is then separated from the closure formerly retaining the plugging material. With drain heater 40 de-energized, the conduit, which now contains plug 35, is reconnected to the vessel 15 with conduit inlet portion 31 communicating with the vessel drain aperture 25.

As before mentioned, the present invention includes disposing conduit 27 in a heat conducting relation to vessel 15 and the environment such that, although material 16 is molten and heater 18 may be energized, plug 35 is below the melting point of the plugging material forming the plug when drain heater 40 is de-energized. As a result and after connecting the conduit to the vessel, when molten melt material 16 is subsequently reestablished in the vessel by bringing the temperature of the material above its melting point, plug 35 prevents flow of the molten material from the vessel through the conduit when heater 40 is de-energized.

Then, at a predetermined draining time when it is desired to drain molten material 16 in vessel 15 into pan 23, drain heater 40 is energized to heat conduit 27 and plug 35 therein, so that the plug dissipates by melting and material 16 drains from the vessel through passage 30 into the pan.

In the practice of the present invention with conduit 27 suitably configured and after draining melt material 16 as just described, a quantity of this material, which is in molten form but is substantially equal in mass to quantity 50, may remain in the conduit to form another plug, which corresponds to plug 35, when the drain heater is again de-energized after such draining. This feature of the invention is, typically, employed when the same material, such as a carbonate salt or salts, is used for the melt material and the plugging material.

It is apparent that upon termination of the heating of conduit 27, as by heater 40, such a remaining quantity cools below its melting point and forms another plug preventing flow of molten melt material, corresponding to melt material 16, from vessel 15 through the conduit when additional such molten material is subsequently established in the vessel. It is also apparent that when such another plug is so formed, no closure need be applied to passage 30 at outlet portion 32 of the conduit.

The necessary configuration of conduit 27 to achieve this result, in which a portion of melt material 16 adheres within passage 30, involves relations between the conduit length, diameter, and internal roughness and the heat transfer to and through the conduit material. It is believed that, for a specific reactor corresponding to reactor 10, one skilled in the art may determine these relations by appropriate experiment and/or calculation.

Although the present invention has been herein shown and described in connection with what is conceived as the preferred embodiment, it is recognized that departures may be made therefrom within the scope of the invention. which is not limited to the illustrative details disclosed.

What is claimed is:

1. Drain apparatus for a flowable material disposed in a vessel, the drain apparatus comprising:
   a drain aperture in the vessel;
   an unobstructed drain conduit detachably fitted to said aperture;
   a quantity of plugging material having a predetermined melting point and disposed in said conduit at a temperature below said melting point so as to form a plug blocking flow of said flowable material through said conduit from the vessel;
   means for heating said conduit, said means being energizable to raise said plug above said melting point so that said plug dissipates and said molten melt material drains from the vessel through said conduit; and
   wherein a predetermined quantity of said plugging material forms said plug and is disposed in said conduit by a method comprising:
   detaching said conduit from said vessel;
   placing said predetermined quantity of said plugging material into said conduit;
   heating said conduit when said conduit is detached from said vessel so as to melt said predetermined quantity of said plugging material so that said predetermined quantity of said plugging material extends across said conduit;
   cooling said conduit below said melting point so that said predetermined quantity of said plugging material solidifies to form said plug in said conduit; and
   reattaching said conduit with said plug to said vessel.

2. The apparatus of claim 1 wherein the flowable material and said plugging material are the same material having said predetermined melting point; wherein the flowable material is above said melting point in said vessel; and wherein said conduit is disposed so that heat transfer from said flowable material does not raise the temperature of said plug above said melting temperature when said means for heating said conduit is de-energized.

3. Apparatus for draining a liquid from a vessel, the apparatus comprising:
   a drain conduit defining an unobstructed passage through said conduit;
   means for detachably connecting said conduit to the vessel for admission of the liquid to said passage;
   a quantity of a plugging substance melting at a predetermined temperature, said substance being available in a form placeable in said passage when below said melting temperature, and said quantity being sufficient to close said passage when melted in said passage;
   first heater means for energization to heat said conduit above said melting temperature and for de-energization so that said conduit cools below said melting temperature, said first heater means being disposed at said vessel for heating said conduit when said conduit is connected to the vessel; and
   second heater means for energization to heat said conduit above said melting temperature and for de-energization so that said conduit cools below said melting temperature, said second heater means being spaced from said vessel for heating said conduit when said conduit is disconnected from the vessel and disposed at said second heater means,
   whereby:
   when said conduit has said quantity of said plugging substance placed in said passage and is disposed at said second heater means; said second heater means is energized to melt said quantity; and said second heater means is then de-energized, said quantity solidifies into a plug in said passage to retain said liquid in said vessel when said first heater means is de-energized and said conduit is connected to the vessel; and
   when said first heater means is then energized, said plug dissipates by melting and the liquid drains from the vessel through said passage.

4. The apparatus of claim 3 wherein said plugging substance, when below said melting temperature, is available in flowable, granulated form for pouring said quantity into said passage when said conduit is disposed at said second heater means.

5. The apparatus of claim 3 wherein the liquid is a melt substance maintained in molten form by heating said vessel, and said conduit is disposed so that, when said conduit is connected to the vessel and said first heater means is de-energized, said conduit is at a temperature below said melting temperature.

6. The apparatus of claim 5 wherein said melt substance and said plugging substance are substantially the same substance.

7. The apparatus of claim 6 wherein said same substance consists substantially of at least one salt effective in molten form for waste disposal.

8. An apparatus for plugging and removal of salt material from a vessel having a drain, comprising:

a drain conduit defining an unobstructed passage through said conduit, connected to said drain;

said salt material having a melting point, above which said salt material comprises a flowing molten state and below which said salt material comprises a solid state;

a drain heater, when energized, capable of heating said drain conduit above said melting point, wherein said salt material within said drain conduit flows through said drain conduit; and, said drain conduit, when said drain heater is de-energized, comprises a temperature below said melting point wherein said salt material wicks at an end of said drain conduit, forming a solid plug;

a second heater capable of heating said vessel above said melting point;

wherein said salt material further comprises a residue salt material, maintained within said vessel when said drain heater and said second heater are energized, that forms said solid plug when said drain heater is de-energized.

9. The apparatus of claim 8, wherein said solid plug, when said drain heater and said second heater are de-energized, prohibits said salt material from exiting said end of said drain conduit.

10. The apparatus of claim 9, wherein said salt material exits said drain conduit when said drain heater and said second heater are energized.

* * * * *